(12) United States Patent
Dutau

(10) Patent No.: US 8,487,490 B2
(45) Date of Patent: Jul. 16, 2013

(54) ELECTRIC ROTATING MACHINE

(75) Inventor: Alexis Dutau, Angouleme (FR)

(73) Assignee: Motuers Leroy-Somer, Angouleme (FR)

( * ) Notice: Subject to any disclaimer, the term of this patent is extended or adjusted under 35 U.S.C. 154(b) by 114 days.

(21) Appl. No.: 13/057,920

(22) PCT Filed: Jul. 28, 2009

(86) PCT No.: PCT/FR2009/051519
§ 371 (c)(1),
(2), (4) Date: Mar. 23, 2011

(87) PCT Pub. No.: WO2010/018334
PCT Pub. Date: Feb. 18, 2010

(65) Prior Publication Data
US 2011/0175468 A1   Jul. 21, 2011

(30) Foreign Application Priority Data

Aug. 12, 2008  (FR) ...................................... 08 55543

(51) Int. Cl.
*H02K 9/04* (2006.01)
(52) U.S. Cl.
USPC ............................................. 310/63; 310/59
(58) Field of Classification Search
USPC .......................... 310/52, 60 A, 62–64, 57–59
See application file for complete search history.

(56) References Cited

U.S. PATENT DOCUMENTS

| | | | | |
|---|---|---|---|---|
| 3,610,975 A * | 10/1971 | Onjanow | | 310/57 |
| 4,908,538 A * | 3/1990 | Geberth, Jr. | | 310/59 |
| 4,918,343 A * | 4/1990 | Heinrich et al. | | 310/58 |
| 6,411,000 B1 * | 6/2002 | Rew | | 310/62 |
| 6,570,276 B1 * | 5/2003 | Morel et al. | | 310/52 |
| 6,781,264 B1 * | 8/2004 | Conrad et al. | | 310/77 |
| 2004/0013526 A1 | 1/2004 | Nilson | | |
| 2006/0251509 A1 | 11/2006 | Spaggiari | | |

FOREIGN PATENT DOCUMENTS

| | | |
|---|---|---|
| EP | 0 238 080 A2 | 9/1987 |
| EP | 0 387 743 A1 | 9/1990 |
| FR | 2 639 162 A3 | 5/1990 |
| FR | 2 723 408 A1 | 2/1996 |
| FR | 2 800 931 A1 | 5/2001 |
| JP | A-60-257736 | 12/1985 |

OTHER PUBLICATIONS

Written Opinion of the International Searching Authority issued in Application No. PCT/FR2009/051519; Dated Apr. 29, 2010.
International Search Report issued in Application No. PCT/FR2009/051519; Dated Apr. 29, 2010 (With Translation).

* cited by examiner

*Primary Examiner* — Tran Nguyen
*Assistant Examiner* — Naishadh Desai
(74) *Attorney, Agent, or Firm* — Oliff & Berridge, PLC

(57) ABSTRACT

An electric rotating machine including a rotor rotating relative to a stator, the rotor rotating a first fan placed at a first end of the stator, and a second fan placed at a second end of the stator opposite to the first end, the first and second fans being configured to generate an air flow from the first fan to the second fan through the rotor and the stator, the first fan comprising an external ring connecting the radial ends of blades together.

15 Claims, 3 Drawing Sheets

Figure 5:
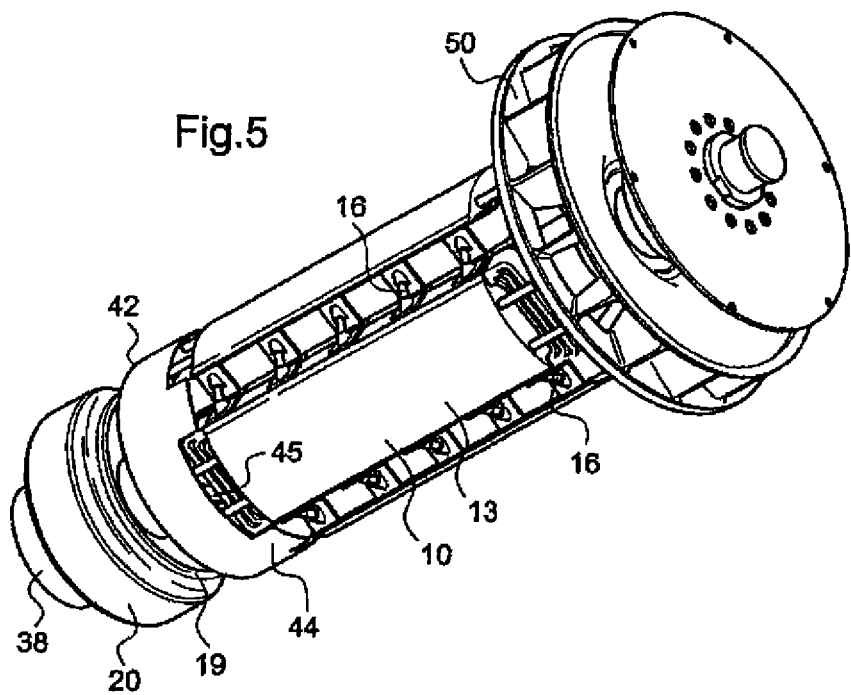

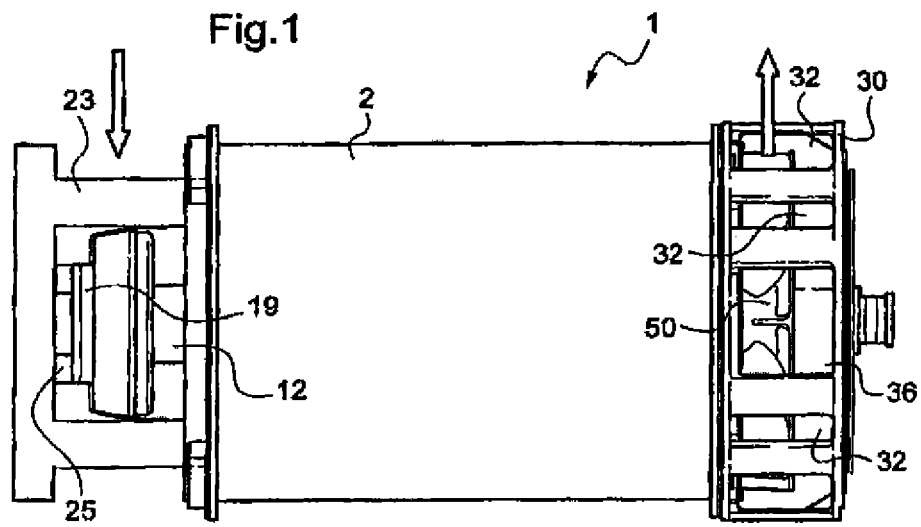
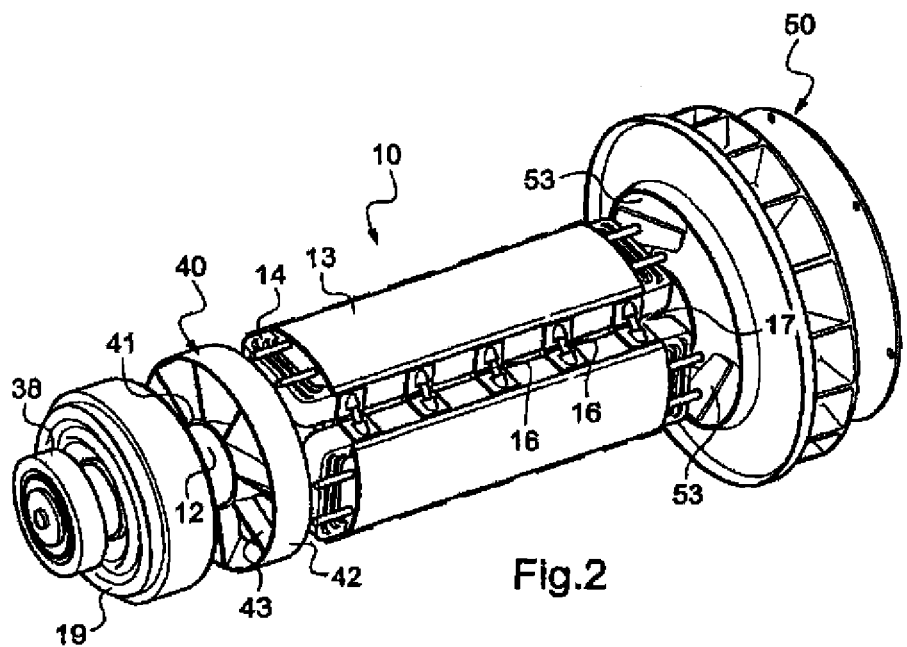

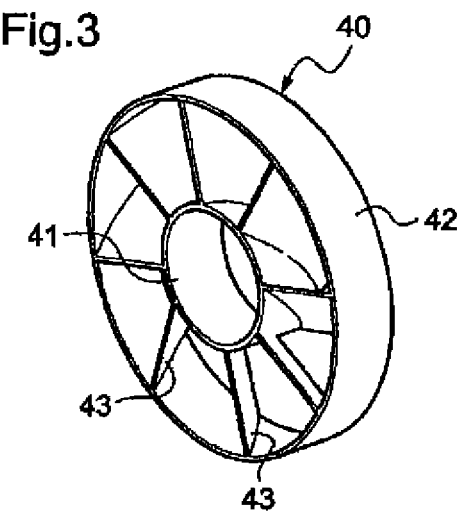
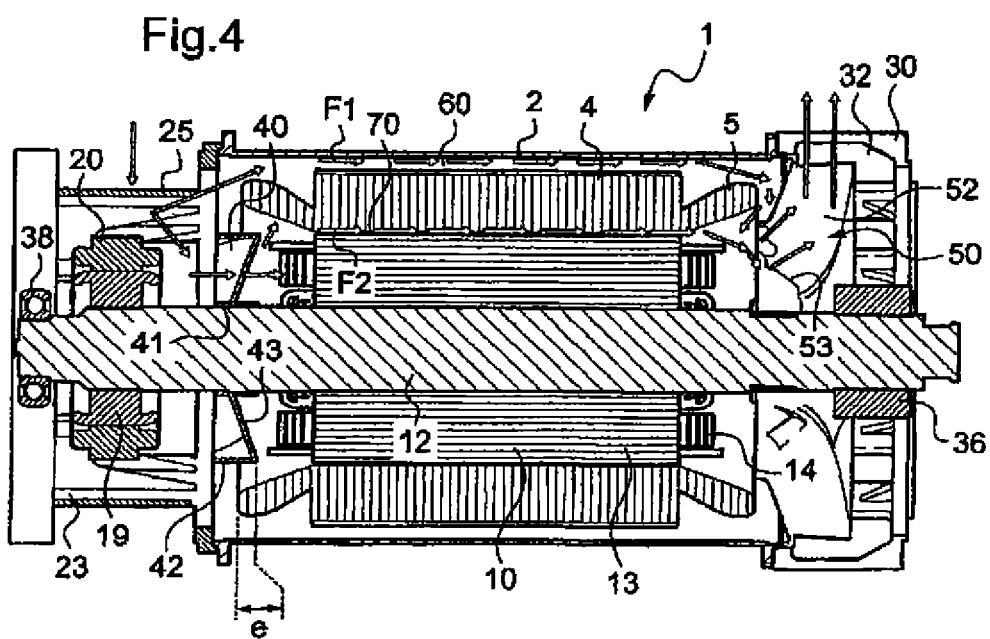

ELECTRIC ROTATING MACHINE

The present invention relates to electric rotating machines and more particularly to the cooling of such machines.

It is known practice to drive with the rotor a fan which ensures the circulation of a cooling fluid, for example air, through the machine.

The object of the invention is to further enhance the cooling of these so-called "open" machines.

The subject of the invention, according to one of its aspects, is an electric rotating machine comprising a rotor, for example a wound rotor, rotating relative to a stator, the rotor rotating a first fan placed at a first end of the stator, and a second fan placed at a second end of the stator opposite to the first end, the first and second fans being configured to generate an air flow from the first fan to the second fan through the rotor and the stator.

The invention makes it possible to increase the overall flow rate of air passing through the machine and therefore the convection exchanges at the rotor or the stator, or even at both.

The invention makes it possible to improve the convection exchanges within open electric rotating machines.

The first and second fans in the invention are placed in series, that is to say that the air flows that pass through them are each oriented in the same direction of flow relative to the axis of rotation of the machine.

The first and/or second fans may be centrifugal, helico-centrifugal or of another type. The two fans may be of the same type or each of a different type. The first fan may notably be axial or helico-centrifugal and the second fan centrifugal or helico-centrifugal.

The first fan may also comprise an external ring connecting the radial ends of blades together. The blades may extend from an internal ring to the external ring while being for example inclined relative to the axis of rotation of the machine, so as to promote a direction of travel of the air flow in the fan.

The first fan may be configured to minimize the aeraulic losses on the blades. The efficiency of the machine can therefore be little influenced by the installation of this first fan.

The external ring may make it possible to optimize the performance of the first fan, making it possible to minimize or even remove the pressure drop at the end of a blade, and make it possible to direct the air flow.

The presence of the first fan makes it possible to create an axial component in the air flow which is blown onto the faces of the winding overhangs of the stator and/or of the rotor. The axial component of the speed of the air flow can therefore be higher. This can allow the appearance of a jet impact on the windings of the rotor, which can induce an increase in the coefficients of convection exchanges and a better cooling of the rotor.

In an axial fan, the direction of air flow at the inlet and at the outlet of the fan remains parallel to the axis of rotation of the machine.

In a helico-centrifugal or centrifugal fan, the direction of flow of the air changes on passing through the fan. This change of direction may for example be greater than 75°, for example 90° approximately for a centrifugal fan and may be between 45° and 75°, for example approximately 60°, for a helico-centrifugal fan.

Moreover, the increase in the speed of the incoming air and the effects of centrifugation due to the rotation of the rotor may combine to make it possible to improve the air flow around the windings of the stator, and notably to increase its turbulence, which can make it possible to induce an increase in the coefficients of convection exchanges at the stator and therefore to improve the cooling of the stator.

Therefore, by virtue of the invention, the air is guided toward the windings of the stator and of the rotor and makes it possible to improve the cooling of the stator and/or of the rotor, and to improve the ventilation performance.

The second fan, also called the main fan, may be configured to create a pressure reduction in the machine and to generate an outgoing air flow.

The first fan is placed on the side of the stator opposite to the second fan, and the first fan is configured to generate an incoming air flow into the machine. This first fan may be configured to promote the heat exchanges around the winding overhangs of the rotor and/or of the stator. It makes it possible to accelerate the speed of the air entering the machine.

The first fan may comprise an internal ring serving as a hub and held on the rotating shaft of the machine, and blades extending from the internal ring.

The presence of internal and external rings may also make the first fan easier to install on the shaft of the machine. The internal ring makes it possible to rotate the first fan and allows its axial positioning. It can be mounted with a key or by being shrink-fitted to the shaft. The external ring can make it possible to optimize the performance of the first fan, making it possible to minimize or even remove the pressure drop at the end of a blade, and makes it possible to direct the air flow.

A first air flow can flow in at least one channel arranged between the stator, notably a packet of metal sheets of the stator, and a casing of the machine. This channel may be formed at least partially between the fins of the packet of metal sheets, for example. The radial dimension of the channel may for example be between 2 and 100 mm. The air can notably flow all around the packet of metal sheets, over 360° about the axis of rotation of the machine.

The rotor defines a gap with the stator. A second air flow can flow in this gap.

The two air flows can each flow in the same direction relative to the axis of rotation of the machine.

The fans can be arranged to cause the air of the first and second air flows to join before reaching the second fan and more particularly the blades of the latter.

The first and second air flows can be formed from one or more common air inlets into the machine.

The first air flow can be made to travel round the winding overhangs of the stator before joining the second air flow. The second air flow can also remain independent of the first.

The second fan can define air-discharge channels oriented obliquely relative to the axis of rotation of the machine.

The flow rate of the first air flow may for example be between 0 and 20 m$^3$/s at an operating temperature of 20° C., that of the second air flow may for example be between 0 and 20 m$^3$/s at an operating temperature of 20° C.

In exemplary embodiments, the machine has no air inlet or air outlet halfway along the machine.

The machine may form an alternator. In this case, the air can enter the machine through openings placed around an exciter of the alternator. The alternator may have an integrated exciter. The machine may also be a motor.

The electric power of the machine is for example greater than or equal to 1 kVA.

A further subject of the invention, according to another of its aspects, is a method for cooling an electric rotating machine, wherein the cooling takes place by causing two air flows to flow between air inlets and air outlets, the first air flow flowing between the stator and the casing of the machine and the second air flow flowing in the gap, the two air flows flowing from one end to the other of the machine under the action of two fans, notably assembled in series.

Figure 6:
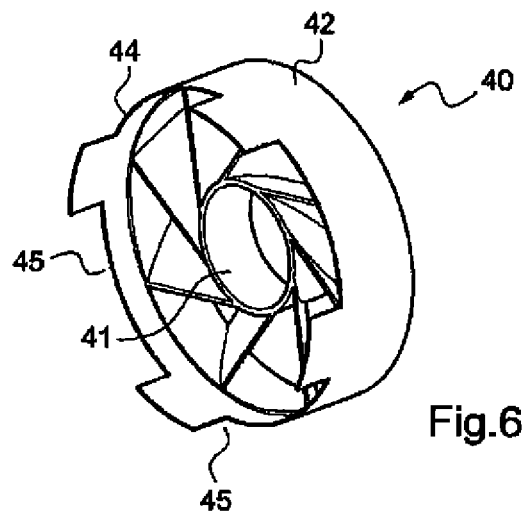

The invention will be better understood on reading the following detailed description of nonlimiting exemplary embodiments of the latter, and on examining the appended drawing in which:

FIG. 1 represents, in a side view, a machine produced according to the invention, FIG. 2 is an exploded view in perspective, after removal of the casing and of the stator, of the machine of FIG. 1, FIG. 3 represents a detail of FIG. 2, FIG. 4 is a schematic and partial longitudinal section of the machine of FIG. 1, FIG. 5 is an exploded view in perspective, after removal of the casing and of the stator, of a variant embodiment, and FIG. 6 represents a detail of FIG. 5.

The electric rotating machine 1 shown in FIGS. 1 to 4 comprises a casing 2 attached to which is a stator 4 which comprises a packet of magnetic stator metal sheets and windings 5 defining winding overhangs.

The machine 1 also comprises a rotor 10 which comprises a shaft 12 supporting a packet of rotor metal sheets 13 and windings 14 defining winding overhangs.

In the examples considered, the machine 1 is a high-power alternator and the rotor, also known as magnet wheel, comprises spacers 16 which hold the windings 14, as can be seen in FIG. 2.

Interpolar channels 17 are formed between the poles of the rotor, as can be seen notably in FIG. 2.

The rotor 10 may support an exciter 19 which may interact with an exciting stator 20, housed within a first endplate 23, which, in the example in question, is fitted to the casing 2 at an axial end of the latter, and supports rolling bearings 38.

The endplate 23 comprises openings 25 which define air inlets for cooling the machine.

The machine 1 also comprises a second endplate 30, placed at the opposite end from the first, which comprises apertures 32 for discharging the cooling air from the machine.

The second endplate 30 supports a rolling bearing set 36.

The rotor 10 rotates a first fan 40 which is partially housed inside the first endplate 23 in the casing of the machine, and a second fan 50, which is partially housed inside the second endplate 30.

The first fan 40 comprises an internal ring 41 attached to the shaft of the machine and an external ring 42 connecting the blades 43.

The second fan 50 comprises a channel 52 within which blades 53 are placed.

The first fan 40 and second fan 50 interact to create a first cooling air flow F1 flowing from the air inlets 25 into at least one passageway 60 situated between the casing 2 and the packet of stator metal sheets, and a second flow F2 flowing in the gap 70 of the machine.

The first fan 40 creates a cooling air flow flowing between the air inlets 25 firstly to the winding overhangs of the rotor and secondly to the winding overhangs of the stator, before entering the gap and the passageway 60 in order to pass through the rotor and the stator in the direction of the second fan 50. The air can also flow in the interpolar channels 17.

The two air flows F1 and F2 can join, the first air flow flowing round the winding overhangs of the stator before joining the second air flow and entering the second fan 50 in order to leave the machine.

In operation, the fans are rotated by the shaft of the machine and the air is drawn into the machine by the first fan and expelled from the machine by the second fan.

The air can leave the machine while being oriented radially and obliquely away from the transverse midplane of the machine.

The packet of stator metal sheets may comprise fins and/or channels, which may or may not be placed in a zigzag, in order to increase the convection exchanges.

The endplates may have particular shapes of the volute type to make it possible to obtain better aeraulic performance. Moreover, in order to prevent recirculation of the cooling fluid between the inlets and the outlets, the endplate 30 may be arranged so that the outgoing air flow is oriented away from the central portion of the machine toward its end.

In the exemplary embodiment illustrated in FIGS. 1 to 4, the external ring 42 of the first fan has a diameter corresponding substantially to that of the rotor so that the free edge of the ring 42 is situated substantially in line with the internal radial surface of the stator.

This ring axially overlaps the winding overhangs of the stator over a distance 1, as can be seen in FIG. 4.

In the example in question, the external ring 42 is circumferentially solid but there is no departure from the context of the present invention if it is otherwise and if this ring 42 comprises for example openings, for example on the portion that overlaps the winding overhangs. These openings may for example take the form of recesses and make it possible to reduce the pressure losses.

In the variant embodiment illustrated in FIGS. 5 and 6, the external ring 42 may be wider than the internal ring 41, comprising a wall of material 44 overlapping the winding overhangs of the rotor. The wall of material 44 may be provided with openings 45 making it possible to limit the pressure losses. These openings 45 may notably be arranged at the poles of the rotor, as can be seen in FIG. 5. Between the openings 45, the wall of material 44 overlaps the interpolar channels 17 arranged between the poles of the rotor.

Naturally, the invention is not limited to the illustrated example.

The machine may be made differently, notably with respect to the shape of the fans, that of the rotor or rotors and/or of the stator or stators. The machine may have no exciter. The machine may have an internal rotor, as illustrated, or an external rotor. The machine may be not an alternator but a motor.

At least one of the fans may be made with channels and/or blades disposed otherwise.

The invention applies to all open machines cooled by a fluid.

The expression "comprising a" should be understood as being synonymous with "comprising at least one", unless specified to the contrary.

The invention claimed is:

1. An electric rotating machine comprising a rotor rotating relative to a stator, the rotor rotating a first fan placed at a first end of the stator, and a second fan placed at a second end of the stator opposite to the first end, the first and second fans being configured to generate at least two air flows from the first fan to the second fan through the rotor and the stator, the first fan comprising an external ring connecting the radial ends of blades together, a first air flow being able to flow in at least one channel arranged between the stator and a casing of the machine, a second air flow flowing in a gap between the rotor and the stator, the first and second air flows joining before reaching the second fan, the external ring being configured to minimize the pressure drop at the end of a blade of the first fan and create an axial component in the air flow from the first fan which is blown up onto faces of the winding overhangs of at least one of the stator and the rotor.

2. The machine as claimed in claim 1, wherein the second fan is configured to create a pressure reduction in the machine and to generate an outgoing air flow.

3. The machine as claimed in claim 1, wherein the first fan is configured to generate an incoming air flow into the machine.

4. The machine as claimed in claim 1, wherein the first fan comprises an internal ring which is held on a shaft of the machine, and blades extending from the internal ring.

5. The machine as claimed in claim 1, wherein the blades are inclined relative to the axis of rotation of the machine.

6. The machine as claimed in a claim 1, wherein a second air flow can flow in a gap between the rotor and the stator.

7. The machine as claimed in claim 1, wherein the fans are arranged in order to cause the air of the first and second air flows to join before reaching the second fan.

8. The machine as claimed in claim 6, wherein the first and second air flows are formed from one or more common air inlets.

9. The machine as claimed in claim 1, the machine forming an alternator.

10. The machine as claimed in claim 9, wherein the air enters the machine through openings placed around an exciter of the machine.

11. The machine as claimed in claim 1, the first fan being axial or helico-centrifugal.

12. The machine as claimed in claim 1, the second fan being centrifugal or helico-centrifugal.

13. A method for cooling an electric rotating machine, wherein the cooling takes place by causing two air flows to flow between air inlets and air outlets, the first air flow flowing between the stator and the casing of the machine and the second air flow flowing in a gap between the rotor and the stator, the two air flows flowing from one end to the other of the machine under the action of two fans, the first and second air flows joining before reaching the second fan, an external ring connecting the radial ends of the blades of the first fan and being configured to minimize the pressure drop at the end of a blade of the first fan and create an axial component in the air flow from the first fan which is blown up onto faces of the winding overhangs of at least one of the stator and the rotor.

14. The machine as claimed in claim 1, the stator comprising a packet of metal sheets.

15. An electric rotating machine comprising a rotor rotating relative to a stator, the rotor rotating a first fan placed at a first end of the stator, and a second fan placed at a second end of the stator opposite to the first end, the first and second fans being configured to generate at least two air flows from the first fan to the second fan through the rotor and the stator, the first fan being configured to generate the first air flow and comprising an external ring connecting the radial ends of blades together, the first air flow flowing in at least one channel arranged between the stator and a casing of the machine, the external ring being configured to minimize the pressure drop at the end of a blade of the first fan and create an axial component in the air flow from the first fan which is blown up onto faces of the winding overhangs of at least one of the stator and the rotor.

* * * * *

UNITED STATES PATENT AND TRADEMARK OFFICE
CERTIFICATE OF CORRECTION

PATENT NO. : 8,487,490 B2
APPLICATION NO. : 13/057920
DATED : July 16, 2013
INVENTOR(S) : Alexis Dutau It is certified that error appears in the above-identified patent and that said Letters Patent is hereby corrected as shown below:

On the Title Page Item (73),

Assignee: replace "Motuers Leroy-Somer, Angouleme (FR)" with --Moteurs Leroy-Somer, Angouleme (FR)--

Signed and Sealed this
Twenty-eighth Day of January, 2014

Michelle K. Lee
*Deputy Director of the United States Patent and Trademark Office*